United States Patent
Kopetzky et al.

(10) Patent No.: US 7,445,290 B2
(45) Date of Patent: Nov. 4, 2008

(54) ADJUSTER OF THE VERTICAL ADJUSTMENT OF A HEAD RESTRAINT

(75) Inventors: Robert Kopetzky, Graz (AT); Walter Schindlegger, Seitensletten (AT)

(73) Assignee: Schukra Geratebau AG, Berndorf (AT)

( * ) Notice: Subject to any disclaimer, the term of this patent is extended or adjusted under 35 U.S.C. 154(b) by 12 days.

(21) Appl. No.: 10/564,716

(22) PCT Filed: Jul. 15, 2004

(86) PCT No.: PCT/EP2004/007893

§ 371 (c)(1), (2), (4) Date: May 30, 2006

(87) PCT Pub. No.: WO2005/007446

PCT Pub. Date: Jan. 27, 2005

(65) Prior Publication Data

US 2007/0145803 A1    Jun. 28, 2007

(30) Foreign Application Priority Data

Jul. 15, 2003  (DE) ................. 103 32 097
Aug. 25, 2003  (DE) ................. 103 39 000
Oct. 10, 2003  (DE) ................. 203 15 594 U

(51) Int. Cl.
*A47C 7/38* (2006.01)

(52) U.S. Cl. ....................... 297/410
(58) Field of Classification Search .......... 297/410, 297/216.12
See application file for complete search history.

(56) References Cited

U.S. PATENT DOCUMENTS

| | | | |
|---|---|---|---|
| 4,222,608 A | 9/1980 | Maeda | |
| 4,765,683 A | 8/1988 | Hattori | |
| 6,192,565 B1 * | 2/2001 | Tame | 297/410 X |
| 6,364,414 B1 * | 4/2002 | Specht | 297/410 |
| 6,390,558 B2 * | 5/2002 | Fischer et al. | 297/410 |

(Continued)

FOREIGN PATENT DOCUMENTS

DE    7920475 U1    11/1979

(Continued)

OTHER PUBLICATIONS

International Search Report, PCT/EP2004/007893.

*Primary Examiner*—Rodney B. White
(74) *Attorney, Agent, or Firm*—Kang Intellectual Property Law, LLC; Grant D. Kang

(57) ABSTRACT

An adjuster is proposed for the vertical adjustment of a head restraint (1, 2) of a seat (3), said head restraint being equipped with adjustment means (4) movable in an adjustment direction (A) which are formed in such a manner that it can engage with a head restraint (1, 2), that can be inserted into the head restraint holder, whereby drive means (8) for producing an adjustment movement of the adjustment means (4) are additionally provided. The drive means (8) in this case form a unit spatially separate from the head restraint holder. The adjustment movement of the drive means (8) in this case is transferred to the adjustment means (4) by flexible transmission means (16), such as, for example, a flexible shaft or a Bowden cable. As a result, the drive unit (8) can be placed independently of the head restraint holder.

23 Claims, 8 Drawing Sheets

U.S. PATENT DOCUMENTS

| | | | |
|---|---|---|---|
| 6,460,931 B2 * | 10/2002 | Beck | 297/410 |
| 6,540,298 B2 * | 4/2003 | Och et al. | 297/410 |
| 7,121,625 B2 * | 10/2006 | Malsch et al. | 297/410 |
| 2001/0013718 A1 * | 8/2001 | Beck | 297/410 |
| 2001/0043005 A1 * | 11/2001 | Och et al. | 297/410 |

FOREIGN PATENT DOCUMENTS

| | | | | |
|---|---|---|---|---|
| DE | 3141515 A1 | 4/1983 | | |
| DE | 2952749 C | 9/1988 | | |
| DE | 3843616 A1 * | 6/1990 | | 297/410 |
| DE | 4031656 A | 4/1992 | | |
| DE | 4325996 A1 | 2/1995 | | |
| FR | 2749812 A | 12/1997 | | |
| GB | 1218541 A | 1/1971 | | |
| GB | 2057255 A | 4/1981 | | |

* cited by examiner

US 7,445,290 B2

ADJUSTER OF THE VERTICAL ADJUSTMENT OF A HEAD RESTRAINT

CROSS-REFERENCE TO RELATED APPLICATIONS

This application claims priority to PCT/EP2004/007893 filed on Jul. 15, 2004; which claims priority to DE 103 32 097.0, filed Jul. 15, 2003; which claims priority to DE 103 39 000.6, filed Aug. 25, 2003 which claims priority to DE 203 15 594.7, filed Oct. 10, 2003.

The present invention relates to an adjuster for the vertical adjustment of a head restraint, for example, a head restraint of a seat in a motor vehicle.

Seats in motor vehicles are equipped with height-adjustable head restraints, in order to adapt the height of the head restraint to a size of a respective user of the seat, for example, a driver. In order to make the vertical adjustment easier, the prior art uses an adjuster with an electrically operated drive. An adjuster of this kind, for example, also offers the advantage that the height of the head restraint can be automatically adjusted on the basis of stored data for different drivers.

In FIG. 9, a conventional electrical adjuster of this kind is diagrammatically represented. A head restraint, consisting of a cushion 1 and support bars or support stays 2, in this case is incorporated into a seat-back 3 of a seat. The support bars 2 in this case engage with an adjusting element 4 of a head restraint holding module 20, which adjusting element 4 can be moved in the vertical direction along a guide rail 5 mounted on a plate 19 in order in this way to move the head restraint up and down as indicated by an arrow A. For moving the adjusting element 4 a drive unit 8, which, for example, can comprise an electric motor and a gear mechanism arranged between the electric motor and the adjusting element, is provided. The movement of the drive unit 8 can in this case, for example, be transferred by a gear wheel/rack combination 18, but other kinds of transmission, such as, for example, by a con-rod or similar are conceivable. The current feeds of an electric motor contained in the drive unit 8 are not represented.

Further, an external control or operating unit 9 is provided, with which the drive unit 8, for example, can be operated via a key in order in this way to release the upward or downward movement of the head restraint.

An arrangement of this kind has a plurality of substantial disadvantages: To start with, the drive unit is located relatively close to a head of the user of the seat, so that noise generated by the operation of the drive device can be a disturbance for the driver.

Furthermore, the adjuster requires a relatively large space due to the incorporation of the drive unit. In modern vehicle seats, however, a plurality of different elements, such as, for example, lumbar supports must also be accommodated, so that installation of such a large adjuster can sometimes prove difficult.

Still further, in the case of the adjuster described above regardless of the fact that the guide rail 5 mentioned is provided, tilt-free movement of the head restraint is not assured, that is to say it is not guaranteed that the adjustment movement is exactly transferred to the head restraint in the vertical direction, whereby this applies in particular when a unilateral counter load acts on the head restraint. A further fundamental problem is optimization of the efficiency, so that the head restraint can be adjusted with as little effort as possible.

The arrangement of FIG. 7 furthermore has the disadvantage that a space is taken between the two support bars 2 in the seat back through the drive unit 8, the guide rail 5, the plate 19 and the adjusting element 4. Since, however, this area is very critical for the comfort of the seat, it must be designed so that the area between the shoulders or the shoulder blades of a driver is well supported. For this purpose possibly it may be desirable to fit adjustment mechanisms, with which the shape of the seat-back can be changed within this area, which likewise need space.

It is, therefore, an object of the present invention to avoid these problems. In particular, it is an object of the present invention to provide an adjuster for the vertical adjustment of a head restraint, through which sound nuisance for a user is reduced and which is more flexible with regard to installation into a backrest. A further object of the present invention is to create an adjuster for the vertical adjustment of a head restraint, which is optimized with regard to the necessary installation space and efficiency. Furthermore, an adjuster is to be made available for the vertical adjustment of a head restraint, which permits tilt-free adjustment or movement of the head restraint. Finally, it is an object of the present invention to provide an adjuster for the vertical adjustment of a head restraint, which does not require any or only minimum space between the support bars of the head restraint, so that this area can be used for other purposes.

The objects detailed above are achieved according to the invention by an adjuster for the vertical adjustment of a head restraint with the features of claim 1. The dependent claims define preferred and advantageous embodiments of the invention, respectively.

According to the invention, an adjuster for the vertical adjustment of a head restraint of a seat, comprising a head restraint holding unit with adjustment means, movable or variable in at least one adjustment direction which in particular can be formed in such a manner that it can engage or can be coupled with a head restraint, which can be inserted into the head restraint holding module, and drive means provided for producing an adjustment movement for the adjustment means, in the case of which the drive means forms a unit spatially or locally separated from the head restraint holder and in the case of which preferably flexible transmission means is provided for transfer of the adjustment movement of the drive means to the adjustment means. By separating the drive means from the head restraint and by using preferably flexible, that is to say bendable, transmission means, the drive means can be placed essentially independently of the head restraint holder in the seat, which allows more flexible spatial layout and also allows the drive means away to be arranged at a distance from a head of a user of the seat, in order to reduce sound disturbance.

The drive means can comprise an electric motor and/or a gear mechanism for coupling or transfer of the adjustment movement produced to the transmission means, whereby in principle manual operation of the drive means, for example via a hand-wheel or similar attached on the side of the seat, is also conceivable.

In a preferred embodiment, the transmission means comprises at least one Bowden cable. Both an arrangement with two Bowden cables, which transfer the traction forces in opposite directions and the use of a Bowden cable for an adjustment primarily in a first direction in combination with energy storage means, for example spring means, which during adjustment in the first direction takes up energy and for adjustment or support of the adjustment in an opposite second direction again releases this, is conceivable.

In another preferred embodiment, the transmission means comprises at least one flexible shaft, which can have a thread at one end, which engages with a thread formed on the adjustment or sliding means. A rotational motion of the flexible shaft can be converted by these threads into a linear motion of the adjustment means corresponding to a spindle drive.

The use described above of only one preferably flexible transmission means, for example, a Bowden cable or rotating shaft, is particularly advantageous in order to further reduce the required installation space, which also permits a corresponding cost reduction.

The adjuster can also comprise an actuation device for operation of the drive means, for example, trip switches for the electric motor or a hand-wheel etc.

In accordance with a further aspect of the present invention, an adjuster is proposed for the vertical adjustment of a head restraint, whereby a head restraint holding module is provided for holding the head restraint, which comprises adjustment means adjustable in at least one adjustment direction for the vertical adjustment of the head restraint. With the aid of transmission means, an adjustment movement produced by drive means is transferred to the adjustment means, whereby energy storage means are coupled with the adjustment means in such a manner that on movement of the adjustment means in a first adjustment direction it can take up energy, in order to assist movement of the adjustment means in a second adjustment direction, which is in particular opposite to the first adjustment direction by releasing the stored energy. The mechanical energy storage means can in particular be spring means, which are preferably arranged on support bars or support stays, that are connected either with the head restraint or are to be coupled with this. The necessary installation space can be optimized by the arrangement on the support bars or support stays. Furthermore, as a result of this arrangement it is also ensured that when adjusting the head restraint no tilt forces arise, which could lead to tilting of the head restraint. Since the energy storage means or spring means supports the movement of the adjustment means in the second adjustment direction or even alone provides for the movement in this second adjustment direction, the entire drive unit can be designed to be space and energy-saving.

In accordance with another aspect of the present invention an adjuster is proposed for the vertical adjustment of a head restraint, whereby a head restraint holding module for holding the head restraint is moved with the aid of adjustment means. Transmission means transfer an adjustment movement from the drive means to the adjustment means, whereby several transmission means of this kind are provided in such a manner that they all transfer the adjustment movement of the drive means in the same direction to the adjustment means. Thus, two Bowden cables, which in each case engage the head restraint in the vicinity of the support bars or support stays, in order therefore to be able to transfer uniform adjustment force to the head restraint, can be used in particular as transmission means. Even when a unilateral counter load acts on the head restraint, tilting is prevented by this measure when adjusting the head restraint, and the entire adjuster can again be designed to be space-saving and optimized with regard to installation space.

According to another aspect of the present invention an adjuster is proposed according to the invention for the vertical adjustment of a head restraint with at least two support elements, which comprise at least two holding modules, whereby each of the at least two holding modules in each case is associated with one of the at least two support elements and is designed for accommodating the same, whereby each of the holding modules comprises adjustment means which can be moved in at least one adjustment direction for the vertical adjustment of a support element stored in the respective holding module, whereby the adjustment means of the individual holding modules are at a distance or separate from one another. The area between the at least two holding modules is therefore in principle free of the adjuster. The adjuster further comprises drive means for producing an adjustment movement to move the adjustment means and preferably also transmission means to transfer the adjustment movement of the drive means to the adjustment means.

By providing two separate holding modules for the at least two support elements the area between the two holding modules can be kept free, so that here a seat-back of a seat, in which the adjuster is fitted, can be designed according to the criteria for comfort without consideration being paid to the adjuster.

The transmission means can in this case again comprise a Bowden cable.

It is possible to make available separate transmission means for the at least two holding modules. It is also possible to transfer the adjustment movement first from the drive means to common transmission means, whereby distributing means transfer the adjustment movement from the common transmission means to the separate transmission means for the at least two holding modules.

The afore-described aspects of the invention are basically independent of one another. Naturally, they can also be combined, however.

The invention is described in detail below with reference to the attached drawing on the basis of preferred embodiments, wherein.

Same elements are designated in all figures with the same reference symbols.

Figure 1:
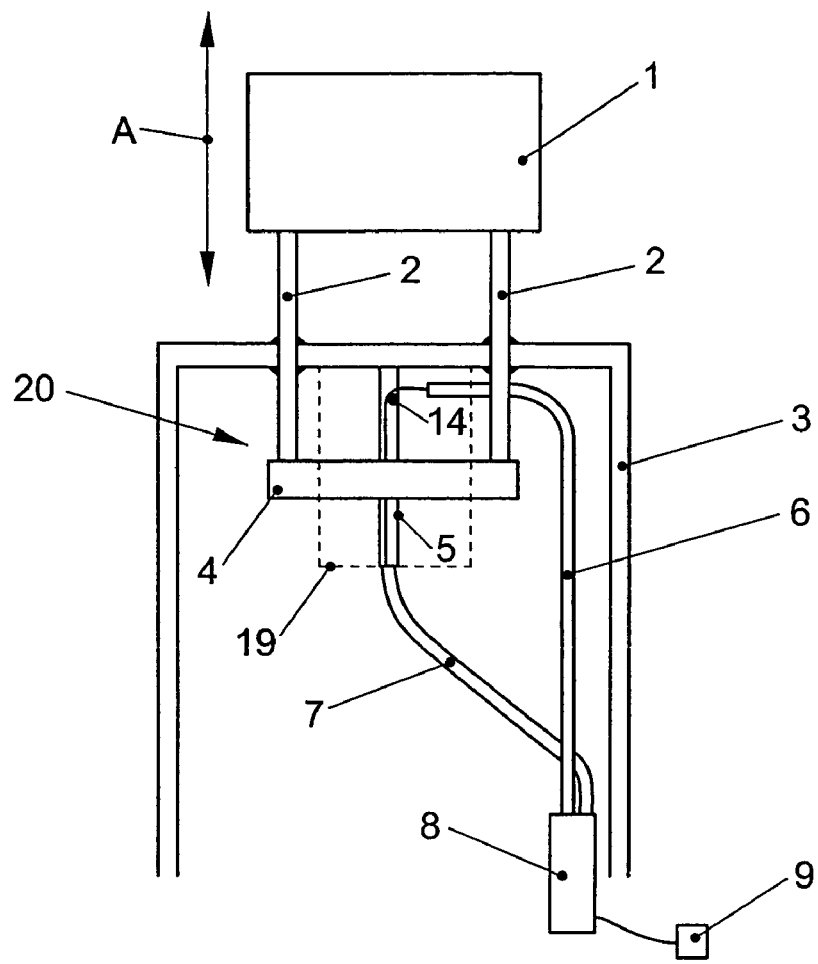
FIG. 1 shows a first embodiment of an adjuster according to the invention.

With this adjuster according to the invention, a guide rail 5 is provided on a plate 19 shown by a dotted line, along which an adjusting element 4 can move up and down. A head restraint consisting of a cushion 1 and two supports 2 can be inserted into the seat-back 3 and in this case engages with the adjusting element, that is to say a movement of the adjusting element at the same time moves the head restraint up and down as indicated by an arrow A. The adjusting element 4 is part of a head restraint holding module 20, with which the head restraint can be coupled or into which the head restraint is to be inserted.

Also, a drive unit 8 is present, which in principle can be fitted at any suitable place in the seat, preferably at a distance from a head of a user. An operating unit 9, by means of which the user, for example, can select an adjustment direction, is connected with the drive unit 8.

An adjustment movement of the drive unit 8 is transferred to the adjusting element 4 via two Bowden cables 6 and 7. Both these Bowden cables work as traction elements. In each case, a first end of the Bowden cables is attached to the drive unit 8, a second end with a sleeve of the respective Bowden cable being fixed to the plate 19 or the guide rail 5. The cable or wire ends of the Bowden cables 6 and 7 are joined to the adjusting element 4 in such a manner that a traction force exerted via the Bowden cable 6 moves the adjusting element 4 upward and a traction force exerted via the Bowden cable 7 moves the sliding element 4 downward. In this case, reverse rollers can be provided such as a guide roller 14, in order to ensure favourable guiding of the cables. Naturally, variations in the guidance of the Bowden cables deviating from FIG. 1 are feasible.

For moving the adjusting element and thus the head restraint upward, in the present embodiment the Bowden cable 6 must be tensioned and the Bowden cable 7 slackened. Vice versa for a movement downward, the Bowden cable 7 must be tensioned and the Bowden cable 6 slackened. A possible drive mechanism for this purpose is now described with reference to FIG. 2.

Figure 2:
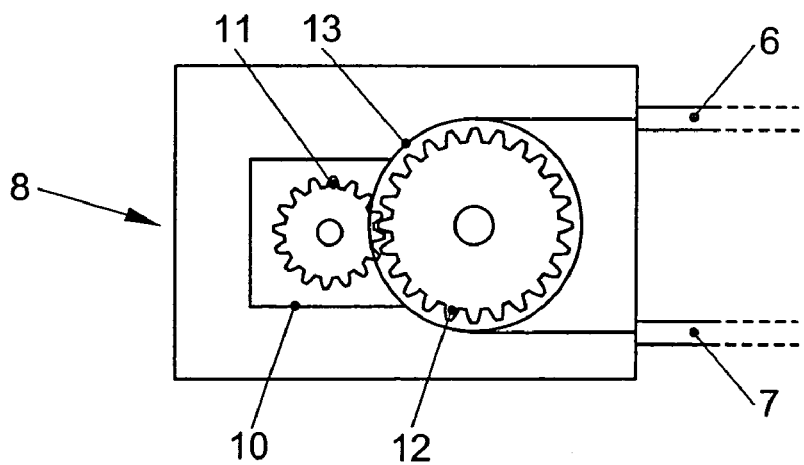
FIG. 2 shows the drive unit of the embodiment of FIG. 1.

FIG. 2 shows a drive unit 8, which can be used for the adjuster represented in FIG. 1.

The drive unit 8 in this case comprises an electric motor 10, which drives a small gear wheel 11. The small gear wheel 11 engages with a large gear wheel 12 and as a result forms a gear mechanism. The large gear wheel 12 is connected via an axle with a drum 13, in which the Bowden cables 6 and 7 engage in opposite directions, so that when the drum 13 is rotated by the gear wheel 12, one Bowden cable is unwound and thus slackened and the other Bowden cable is wound up and thus tightened.

Naturally, the gear mechanism formed by the gear wheels 11 and 12 can also be more complex and contain more gear wheels. The gear wheels in this case are dimensioned in each case according to a desired rotational speed of the drum 13 dependent on an rpm speed of the electric motor 10.

Figure 3:
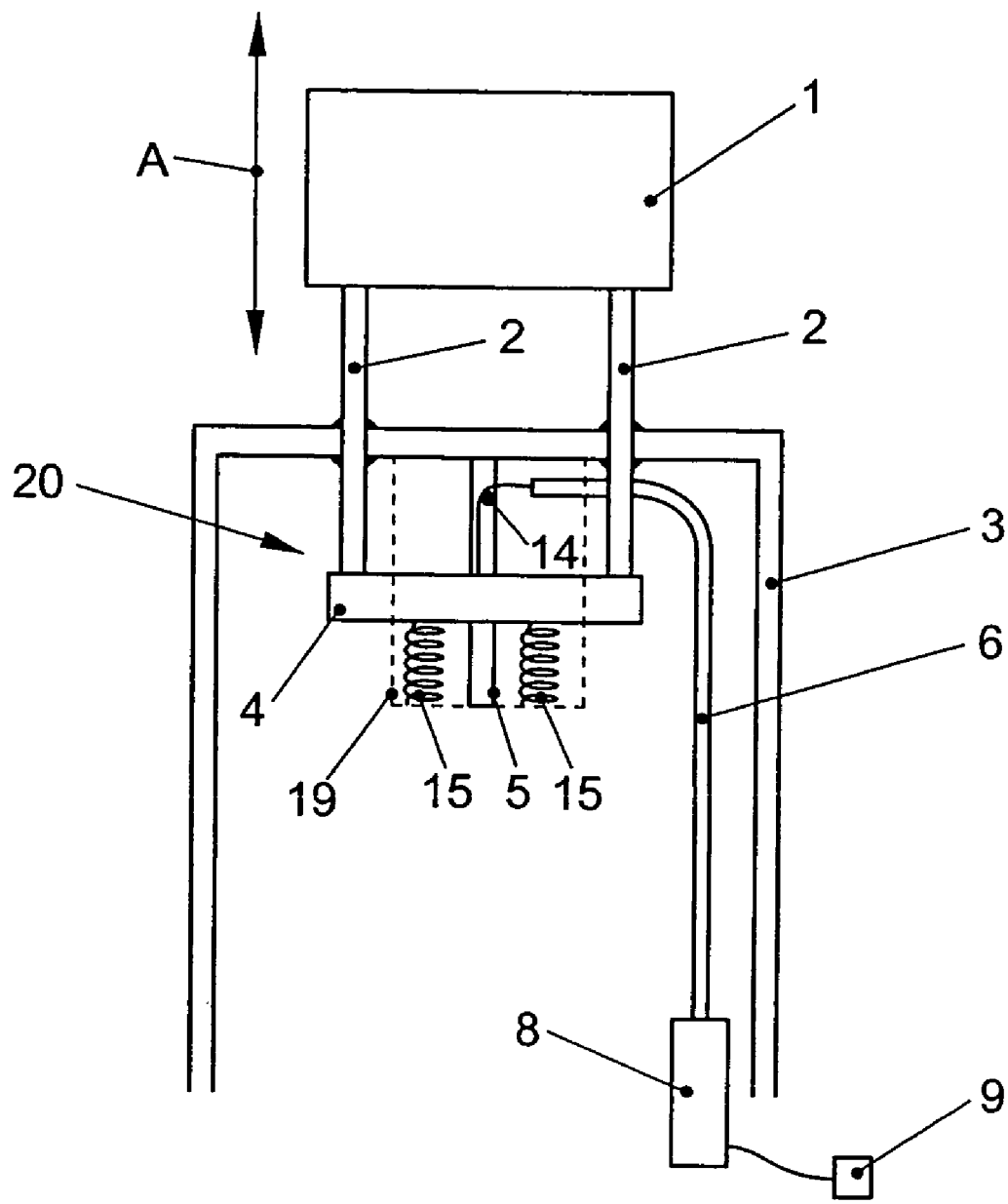
FIG. 3 shows a second embodiment of an adjuster according to the invention.

FIG. 3 shows a second embodiment of an adjuster according to the invention. In order to avoid repetition, only the differences to the adjuster represented in FIG. 1 are described.

The adjustment movement of the drive unit is transferred in the case of the embodiment shown in FIG. 3 via a single Bowden cable 6, which is advantageous in that also only this Bowden cable must be buried in the seat. Springs are additionally provided. The springs 15 in this case are formed as tension springs, that is to say, whenever the adjusting element 4 is in its lowest position, the springs are relaxed, but on the other hand if the sliding element 4 is further upward in the drawing, the springs 15 are expanded in relation to the rest position and thus exert a force on the adjusting element 4, which is directed downward in the drawing. The sliding element and thus the head restraint can be moved upward by the Bowden cable 6 being tensioned, that is to say a traction force being exerted on the wire of the Bowden cable 6. This can happen with a drive unit 8 similar to that shown in FIG. 2. If the Bowden cable, however, is slackened, the springs 15 again force the sliding unit 4 downward. Naturally, a reverse arrangement of the springs and the Bowden cable is also possible. Likewise, an arrangement of the springs as compression springs in place of the arrangement as tension springs is conceivable. Finally, it should also be pointed out that in place of the springs 15 in principle mechanical energy storage means, in particular different elastic elements or similar, could generally be fitted, which can take up energy when the Bowden cable 6 is tensioned, in order to be able to again release the stored energy when the Bowden cable 6 is slackened and thus allow adjustment of the adjusting element 4 in the direction opposite the traction direction of the Bowden cable 6 or assist this.

Figure 4:
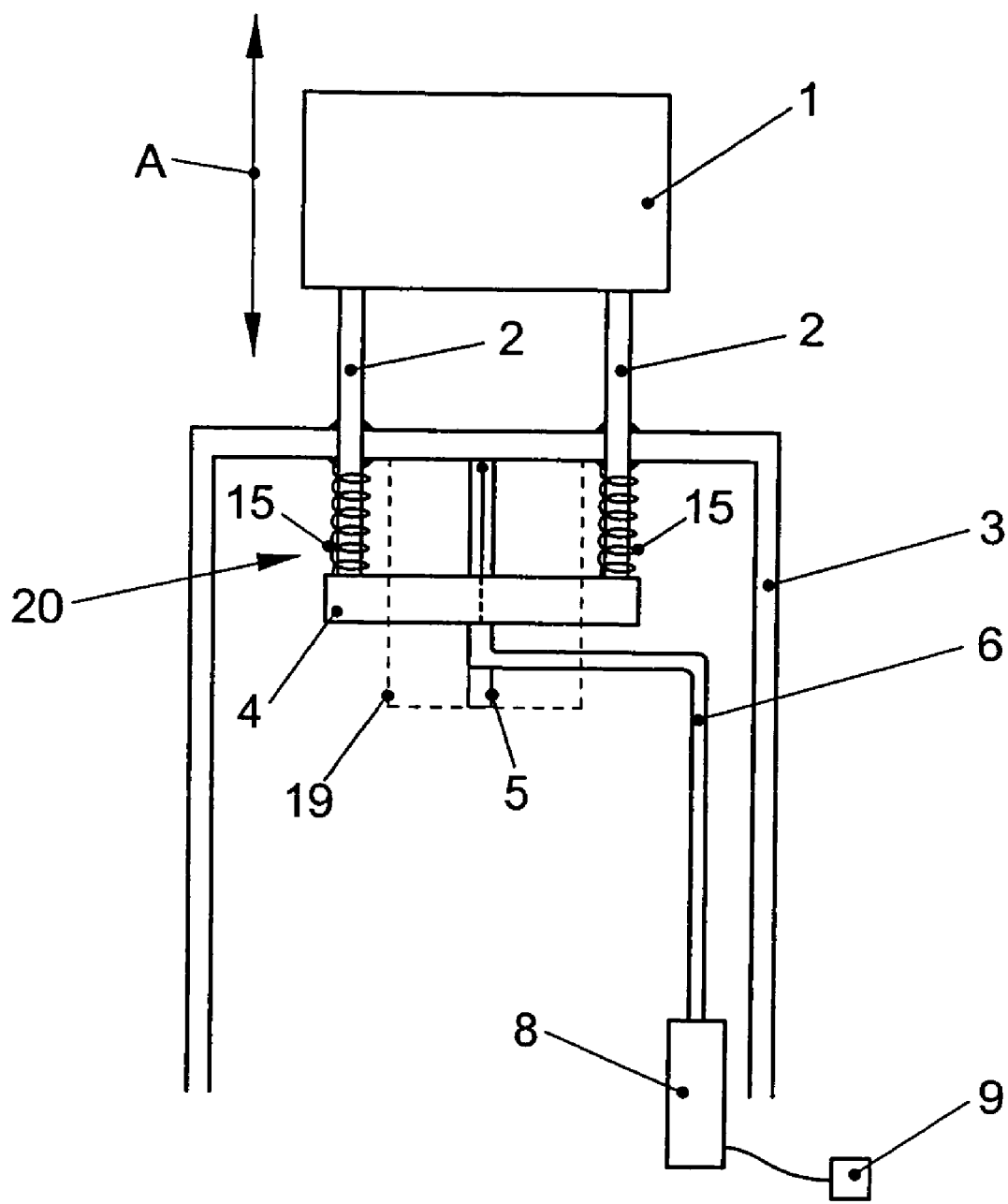
FIG. 4 shows a third embodiment of an adjuster according to the invention.

FIG. 4 shows a third embodiment of an adjuster according to the invention.

In the case of the embodiment shown in FIG. 4, only one Bowden cable 6 engages the adjusting element 4, whereby, in contrast to the embodiments described above, the head restraints are not pulled upwards through the adjustment movement of the Bowden cable 6 but are pushed upwards. For this purpose, the sleeve of the Bowden cable 6 is supported on the adjusting element 4, while the cable or the wire of the Bowden cable 6 is fed upward through the adjusting element 4 and secured there at a suitable place, for example in the seat-back 3 or a corresponding frame. Again, there are springs 15 provided, whereby in contrast to FIG. 3 the springs in accordance with the embodiment in FIG. 4 are attached on the side opposite the sleeve of the Bowden cable 6 of the adjusting element 4 on the support bars or support stays 2. The springs 15 are formed as compression springs, so that when the adjusting element 4 is pushed upward by the Bowden cable 6 the springs 15 are squeezed together, that is to say compressed. When the Bowden cable 6 is slackened a downward movement of the adjusting element 4 takes place with the head restraint coupled to it, as a result of the decompression of the springs 15, whereby for this purpose the springs 15 are supported at a suitable place in the seat-back 3.

Figure 5:
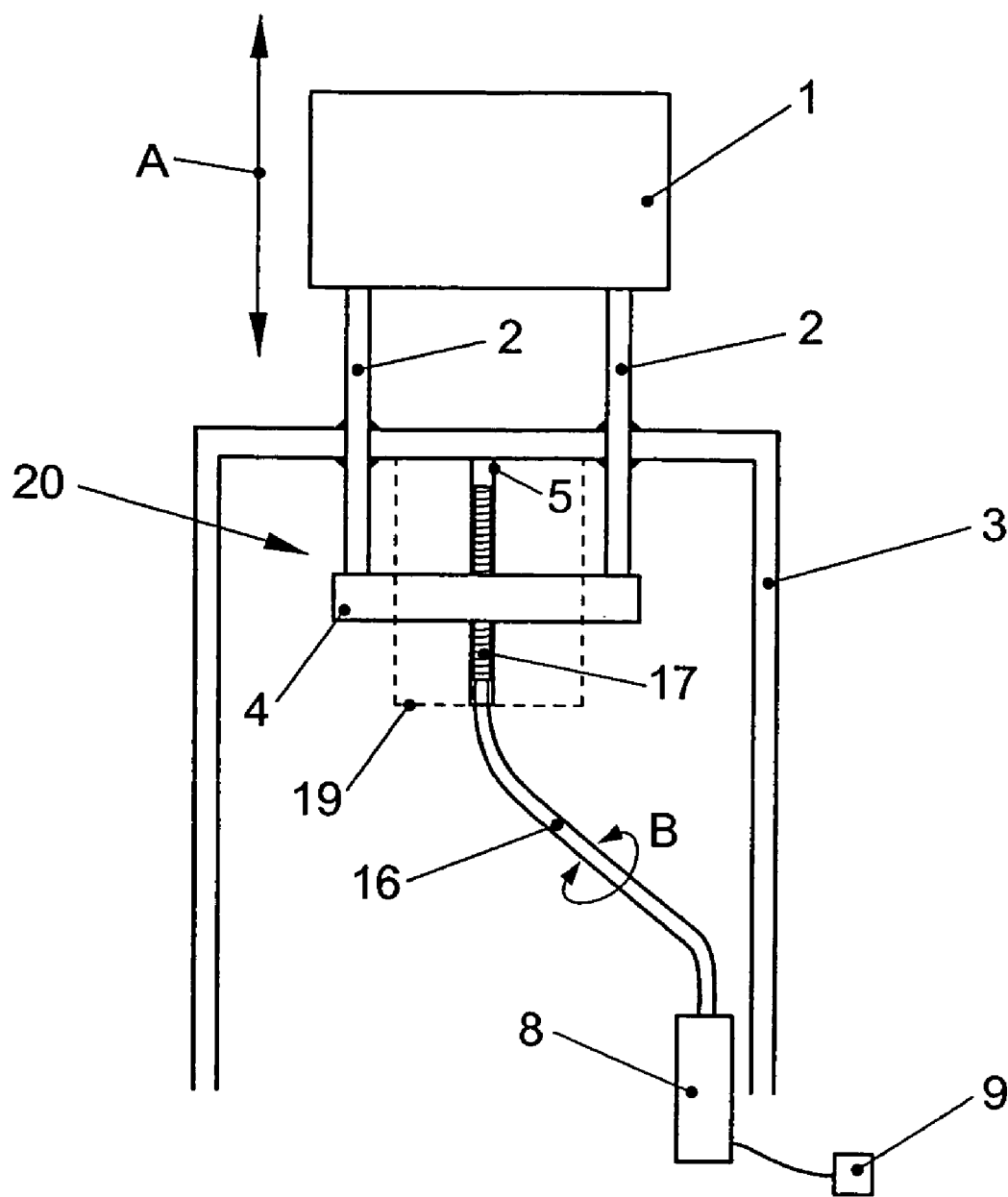
FIG. 5 shows a fourth embodiment of an adjuster according to the invention.

FIG. 5 shows a fourth embodiment of an adjuster according to the invention. Again, only the differences to the embodiments represented above are shown.

In the embodiment represented in FIG. 5, the adjustment movement of the drive unit 8 is transferred to the adjusting element 4 via a flexible shaft 16, which carries out a rotational motion as indicated by an arrow B dependent on the adjustment movement produced by the drive unit 8. A thread section 17, which engages with a corresponding internal thread of the adjusting element 4 is formed at the end of the flexible shaft. With the embodiment represented, the thread section 17 is arranged above the guide rail 5, that is to say parallel to the plane of projection. However, an arrangement by the side of the guide rail 5 etc. is also conceivable.

As a result of the thread section 17 and the corresponding internal thread of the adjusting element 4, a spindle drive is formed, that is to say, the rotational motion of the flexible shaft 16, which can also be called torque rod, can be converted into a linear motion of the adjusting element 4 and thus also the head restraint.

In the case of this embodiment likewise only a flexible transmission means, that is to say the flexible shaft 16, is necessary for the transfer of movement. In addition, the springs of the embodiment represented in FIG. 3 can also be dispensed with, so that fewer parts are needed.

Figure 6:
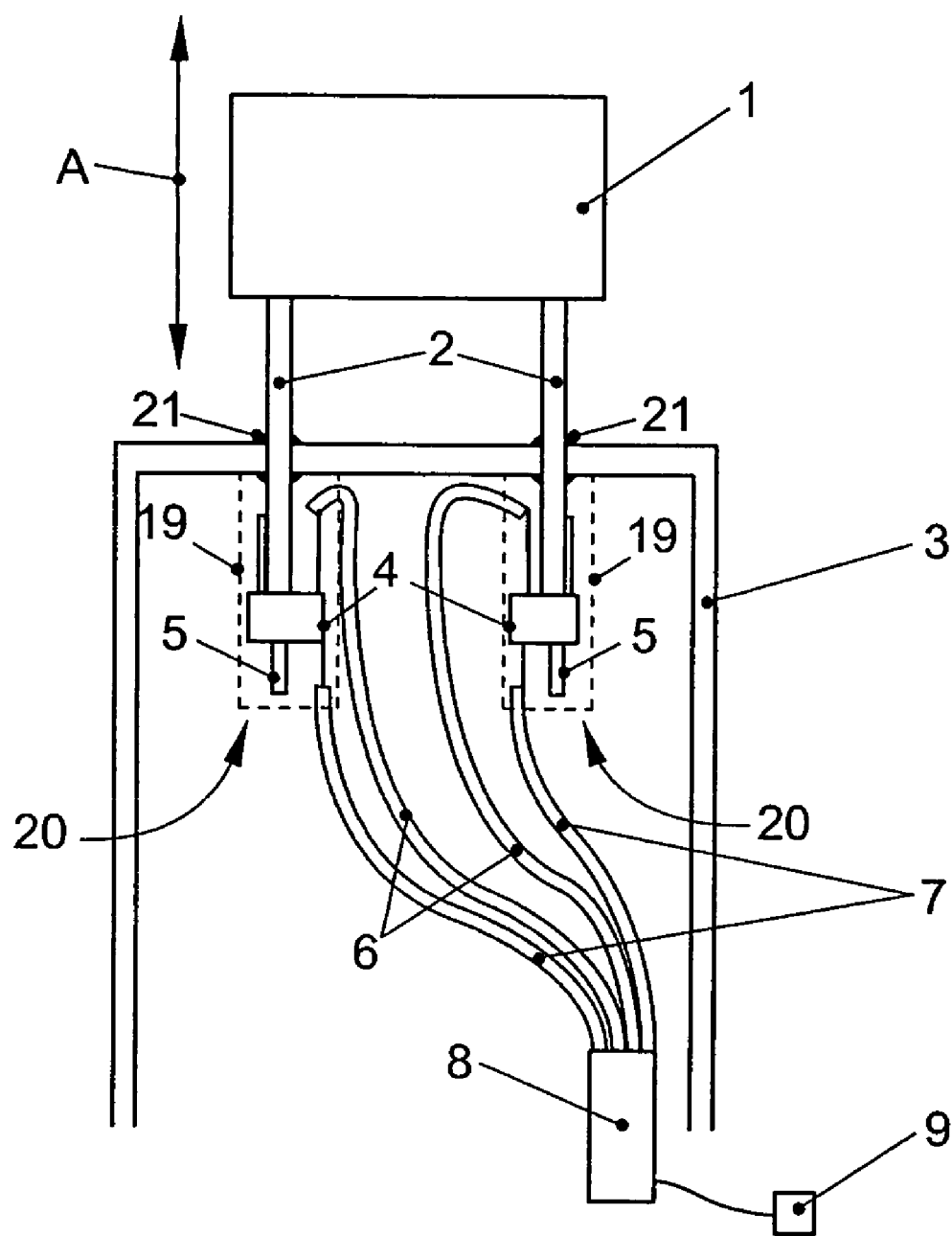
FIG. 6 shows a fifth embodiment of an adjuster according to the invention.

FIG. 6 shows a fifth embodiment of an adjuster according to the invention, whose mode of operation is similar to the mode of operation of the embodiment represented in FIG. 4, so that only the relevant differences to the embodiment represented in FIG. 4 are described in the following.

In the case of this adjuster according to the invention, two holding modules 20 are provided. A head restraint, consisting of a cushion 1 and two stay bars or support bars 2, can be inserted through openings 21 in a seat-back 3, whereby each support bar 2 is accommodated in a holding module 20.

Each holding module 20 in this case comprises an adjusting element 4, which engages with the respective support bar 2 and can be moved up and down on a guide rail 5 mounted on a plate 19. A simultaneous synchronous movement of the adjusting elements 4 in both holding modules therefore moves the head restraint up and down as indicated by an arrow A. Further, again a drive unit 8 is provided, which in principle can be fitted in any suitable place in the seat, preferably away from a head of a user. A control unit 9, by means of which a user can select an adjustment direction for example, is connected with the drive unit 8.

An adjustment movement of the drive unit 8 is transferred to the adjusting elements 4 in each case via two Bowden cables 6 and 7. These Bowden cables in each case work as traction elements. In each case, a first end of the Bowden cables 6, 7 is joined to the drive unit 8, a second end being joined with a sleeve of the respective Bowden cable 6, 7 to the plate 19 or the guide rail 5 and supported there. The cable or wire ends of the Bowden cables 6 and 7 are joined to the adjusting elements 4 in such a manner that a traction force exerted via the Bowden cable 6 moves the adjusting elements 4 upwards and a traction force exerted via the Bowden cable 7 moves the adjusting elements 4 downwards. Reverse rollers can also be provided, in order to ensure optimum guidance of the cables. Naturally, variations in the guidance of the Bowden cables deviating from FIG. 6 are feasible.

As evident in FIG. 6, the space between the holding modules 20 is not or hardly used, so that here the seat-back can be designed according to criteria for comfort without consideration being paid to the holding modules. Depending on requirements, the Bowden cables 6, 7 can also be laid on the exterior sides of the holding modules 20 or with regard to the plane of projection towards the front or towards the back, if these should hinder a design of the seat-back.

For moving the adjusting elements 4 and thus the head restraint upwards in the present embodiment the Bowden cables 6 must be tensioned and the Bowden cables 7 slackened. Vice versa for a downward movement the Bowden cables 7 must be tensioned and the Bowden cables 6 slackened. The Bowden cables 6 and 7 in this case should be tensioned or slackened synchronously so that the adjustment means 4 can move up or down synchronously. A possible drive mechanism for this purpose is now described with reference to FIG. 2.

Figure 7:
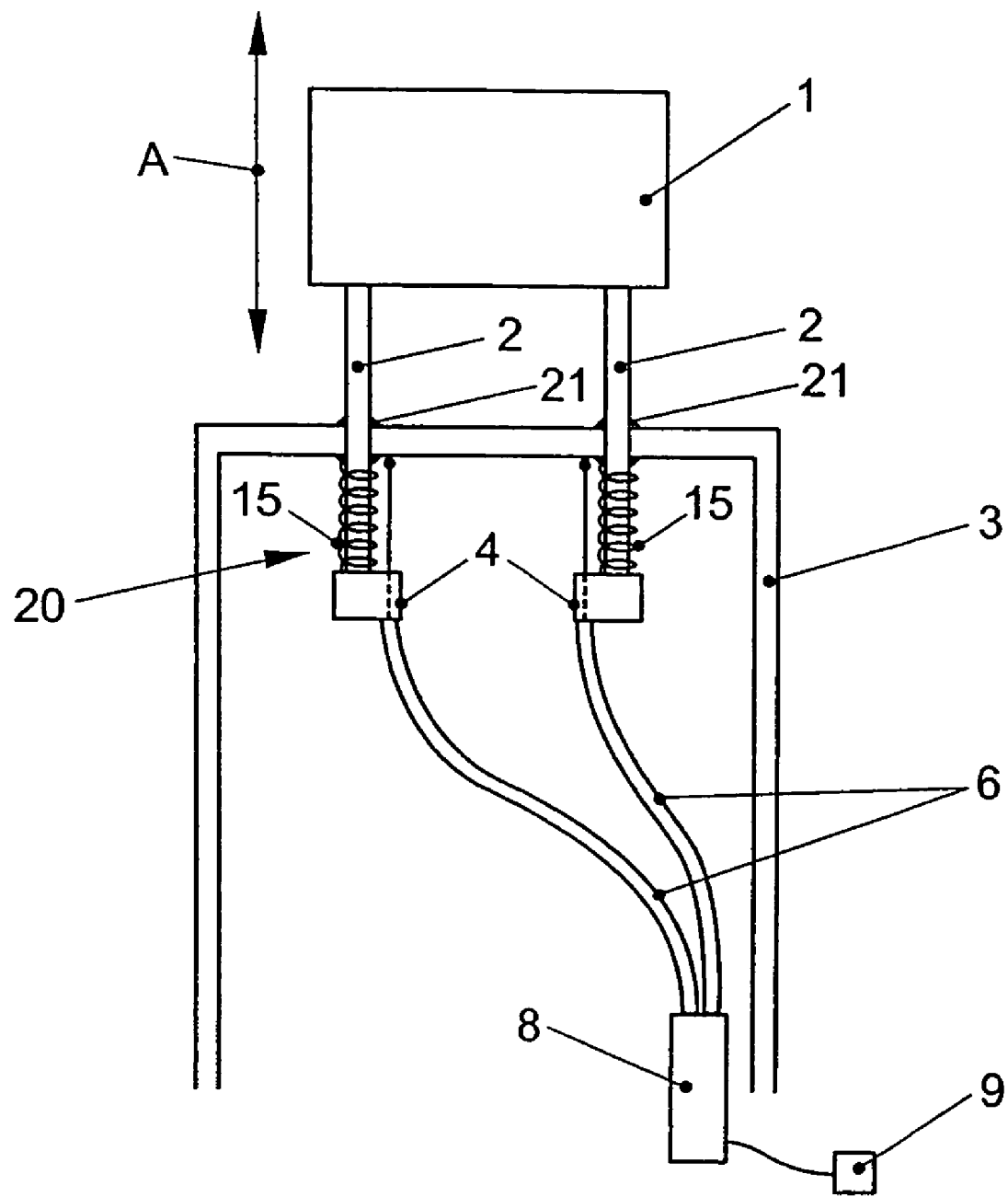
FIG. 7 shows a sixth embodiment of an adjuster according to the invention.

FIG. 7 shows a sixth embodiment of an adjuster according to the invention. In order to avoid repetition, only the differences to the adjuster represented in FIG. 6 are described.

In the case of the embodiment represented in FIG. 7, each holding module 20 comprises an adjusting element 4 and a spring 15, which is pushed onto the respective support bar 2 and is clamped between the seat-back 3 and the adjusting element 4. With this embodiment, no plates 19 and no guide rails 5 are provided. The support bars 2 in this case are guided through the openings 21.

The adjusting elements 4 are moved in each case via a single Bowden cable 6, whereby in contrast to the embodiment described above the head restraint is not pulled upward by the adjustment movement of the Bowden cables 6, but is pushed upward. For this purpose, the sleeves of the Bowden cables 6 are supported in each case on an adjusting element 4, while the cables or the wires of the Bowden cables 6 are fed upward through the respective adjusting element 4 and joined there at a suitable place, for example the seat-back 3 or a suitable frame. This corresponds to the mechanism shown in FIG. 3, whereas the mechanism shown in FIG. 6 in principle corresponds to the mechanism shown in FIG. 1.

The springs 15 in this case again are formed as compression springs, so that when the adjusting elements 4 are pushed upward by the Bowden cable 6 the springs 15 are squeezed together, that is to say compressed. When the Bowden cables 6 are slackened, the adjusting elements 4 with the head restraint coupled with them move downward through the decompression of the springs 15.

The coupling of the Bowden cables 6 with the drive unit 8 in this case is again such that an adjusting movement produced by the drive unit 8 is transferred to the Bowden cables 6 to the same extent, so that the two adjusting elements 4 are moved up or down accordingly and the support bars 2 coupled with them are moved up or down to the same extent, regardless of the fact that two Bowden cables 6 are used.

Naturally, in this embodiment a plate and a guide rail can also be provided similarly as shown in FIG. 6. Vice versa the plate 19 and the guide rail 5 in FIG. 1 can also be economized, if the Bowden cables can be supported otherwise in an appropriate way, and the guidance through the opening 21 is sufficient.

Figure 8:
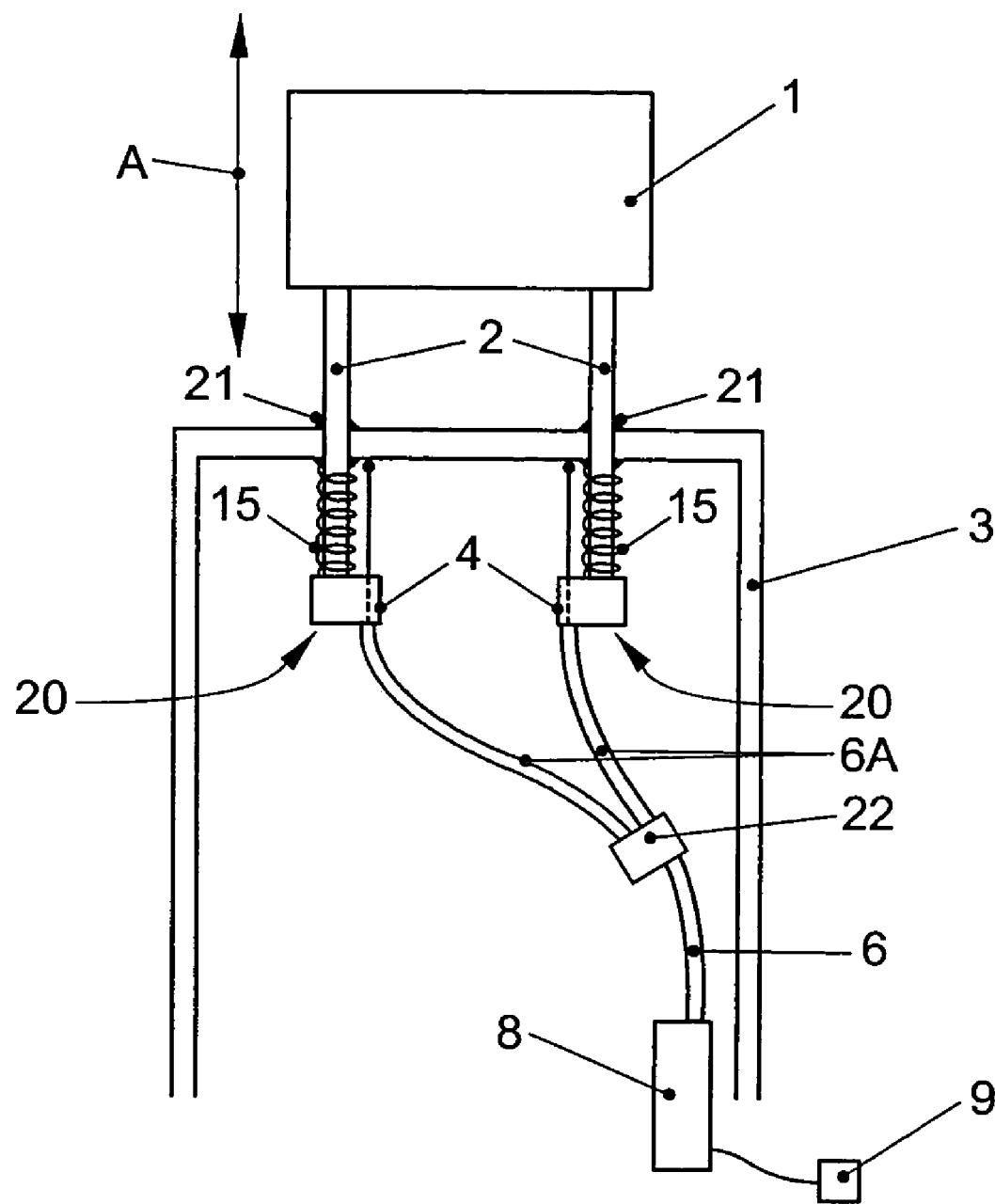
FIG. 8 shows a seventh embodiment of an adjuster according to the invention.
Figure 9:
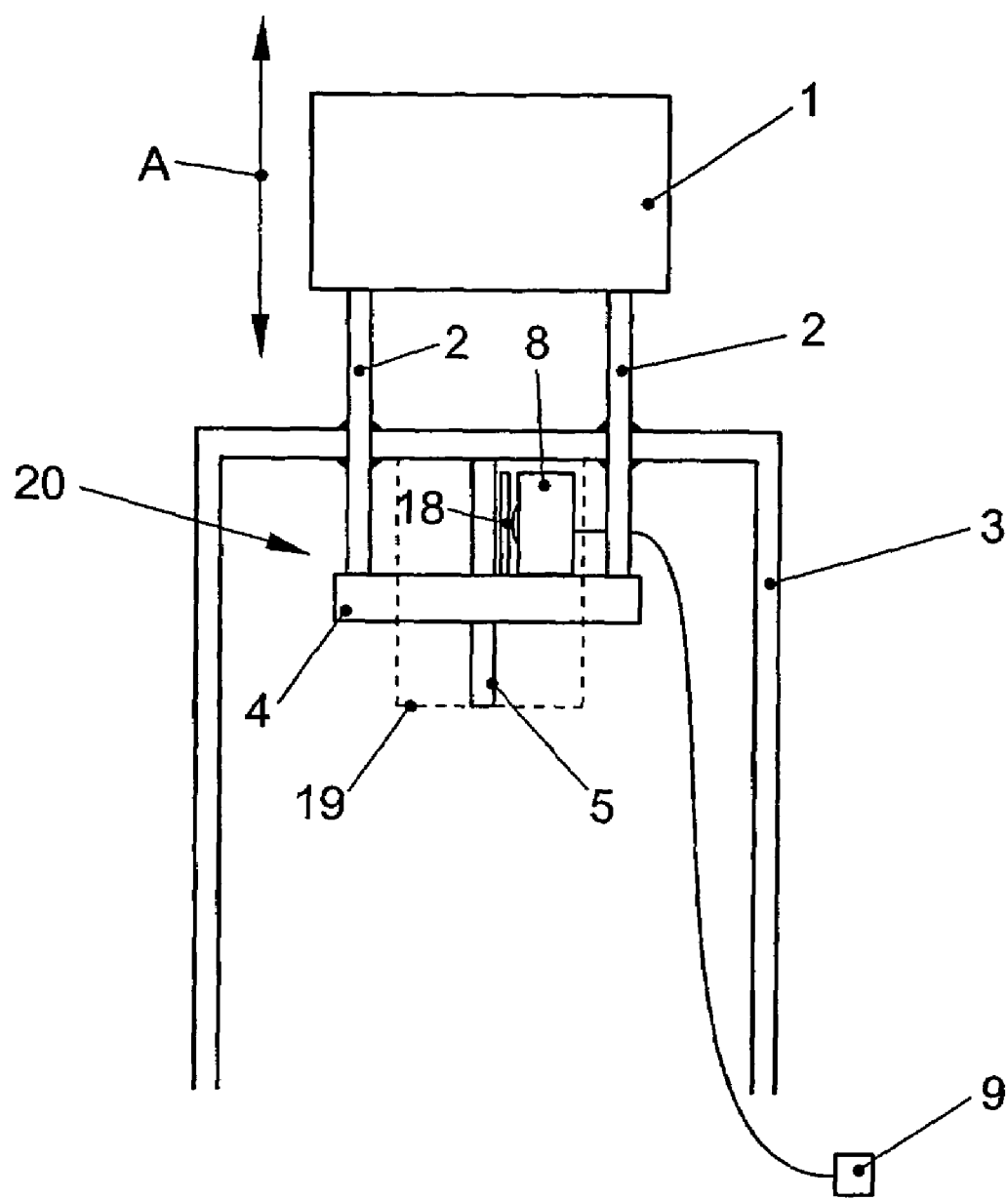
FIG. 9 shows an adjuster according to the prior art.

In FIG. 8 a seventh embodiment of the present invention is represented.

The embodiment shown in FIG. 8 in this case essentially corresponds to the embodiment of FIG. 7, so that only the differences are described.

In contrast to FIG. 7, the adjustment movement of the drive unit 8 is first transferred to only one Bowden cable 6. A so-called split-box 22 then transfers this adjustment movement in the same way to two Bowden cables 6A, which just as the Bowden cables 6 in FIG. 7 are coupled with the adjusting elements 4 and in the same way as described there serves to move the adjusting elements 4. The split-box 22 can be formed in a simple way, by the cables of the Bowden cable 6 and the Bowden cables 6A being directly connected with one another or for example a coupling via cable drums, gear wheels or other mechanical elements can be provided.

Naturally, in the case of the embodiments represented in FIG. 7 and FIG. 8 it is—similar to the embodiment of FIG. 3—also possible to design the springs as extension springs and the Bowden cables as traction elements. In this case, for example, Bowden cables would pull the adjusting elements 4 downward and at the same time tension a spring. When the Bowden cables are slackened accordingly, the springs would again be released and thus pull the adjustment means 4 upwards. In the same way, a reversal of the working direction of the Bowden cables and the springs is possible.

With the embodiments shown, the area between the holding modules 20 remains free, so that here the seat-back 3 can be designed regardless of the adjustment device.

Also, in the embodiments shown the drive means are in each case arranged away from the head restraint, so that a noise disturbance for a user of the seat is kept to a minimum. Finally, the use of two holding modules for the two support bars, when a one-sided back load acts on the head restraint or cushion of the head restraint, can prevent tilting of the head restraint. Even when a one-sided back load of this kind acts on the head restraint, tilt-free adjustment of the head restraint is ensured, since the adjustment movement can be transferred evenly to the two support bars 2. This effect is present even if the space between the holding modules 20 is not free, e. g. when for space reasons the drive means 8 are positioned between the holding modules 20.

Naturally, this invention is not limited to the use of Bowden cables, but in principle any suitable transmission means, which permit the transfer of an adjustment movement from the drive unit 8 to the adjusting elements 4, can be used.

Likewise, other variants of the embodiments presented are conceivable. For example, more than one guide rail can be provided, the number and strength of the springs can be varied etc. As a drive unit, in principle a unit can also be used for manual operation of the adjuster device or the different drive systems can be combined. Also, in the case of the embodiments mentioned above it has been assumed for the sake of simplicity that the support elements or support bars 2 of the head restraint are directly connected with the adjusting element 4, whereby it is naturally also possible that these project into corresponding holding modules of the adjusting element 4 and therefore engage with these.

The invention claimed is:

1. An adjuster for the vertical adjustment of a head restraint, comprising:

at least one head restraint holding module for holding the head restraint, the at least one head restraint holding module having a first adjusting element to be engaged with a first support bar of the head restraint and a second adjusting element to be engaged with a second support bar of the head restraint, the first and second adjusting elements being variable in at least one adjustment direction for vertical adjustment of the head restraint held by the at least one head restraint holding module, a first flexible transmission means being in communication with the first adjusting element and a second flexible transmission means being in communication with the second adjusting element, and a drive means coupled to the first and second adjusting elements for producing an adjustment movement for moving the first and second adjusting elements.

2. An adjuster according to claim 1, wherein the at least one head restraint holding module comprises:

at least two holding modules, whereby each of the at least two holding modules is associated with one of the first and second support bars and is designed to accommodate the same;

whereby one of the first and second adjusting elements is in communication with each of the at least two holding modules; and wherein the first and second adjusting elements of the at least two holding modules are at a distance from one another.

3. An adjuster according to claim 1, further comprising:

common transmission means and distribution means, the common transmission means transferring the adjustment movement of the drive means to the distribution means, whereby the distribution means transfers the adjustment movement from the common transmission means to the first and second flexible transmission means to the same extent.

4. An adjuster according to claim 1, wherein the drive means comprises an electric motor for producing the adjustment movement.

5. An adjuster according to claim 1, wherein the drive means comprises a gear mechanism for transfer of the adjustment movement to the first and second flexible transmission means.

6. An adjuster according to claim 1, wherein the first and second flexible transmission means each comprise exactly one transmission element for transfer of the adjustment movement of the drive means to the adjusting element.

7. An adjuster according to claim 1, wherein the first and second flexible transmission means comprise at least one Bowden cable.

8. An adjuster according to claim 1, wherein the first and second flexible transmission means are adapted to transfer a force to the first and second adjusting elements, respectively, for movement of the first and second adjusting elements in a first adjustment direction;

wherein the at least one head restraint holding module further comprises mechanical energy storage means coupled with the first and second adjusting elements, the mechanical energy storage means adapted to take up energy on movement of the first and second adjusting elements in the first adjustment direction; and wherein the mechanical energy storage means assists movement of the first and second adjusting elements in a second adjustment direction by releasing stored energy.

9. An adjuster according to claim 8, wherein the first adjustment direction is different from the second adjustment direction.

10. An adjuster according to claim 8, wherein the mechanical energy storage means is flexible.

11. An adjuster according to claim 8, wherein the mechanical energy storage means comprises a spring.

12. Adjuster according to claim 11, wherein the spring is in communication with the first and second adjusting elements;

wherein the spring is tensioned on movement of the first and second adjusting elements in the first adjustment direction; and wherein the spring assists the movement of the first and second adjusting elements in the second adjustment direction.

13. An adjuster according to claim 11, wherein the spring is in communication with the first and second adjusting elements;

wherein the spring is compressed on movement of the first and second adjusting elements in the first adjustment direction; and wherein the spring assists the movement of the first and second adjusting elements in the second adjustment direction.

14. Adjuster according to claim 8, wherein the mechanical energy storage means is disposed on the first and second support bars the mechanical energy storage means being coupled to the head restraint and further coupled to the first and second adjusting elements.

15. An adjuster according to claim 1, wherein the first and second flexible transmission means comprise at least one shaft for transfer of the adjustment movement of the drive means to the first and second adjusting elements.

16. An adjuster according to claim 15, wherein the at least one shaft is coupled with the first and second adjusting elements such that a rotational motion transferred by the drive means to the at least one shaft causes a linear adjustment movement of the first and second adjusting elements.

17. An adjuster according to claim 15, wherein a portion of the at least one shaft is threadedly engaged to the first and second adjusting elements, and wherein said at least one shaft forms a spindle drive for the first and second adjusting elements.

18. An adjuster according to claim 17, wherein the portion of the at least one shaft has a thread, adapted for engagement with a thread formed on the first and second adjusting elements, in order to form the spindle drive.

19. An adjuster according to claim 15, wherein the at least one shaft is flexible.

20. An adjuster according to claim 1, wherein the adjuster comprises an actuation device for operation of the drive means.

21. An adjuster according to claim 1, wherein the drive means is disposed at a distance from the at least one head restraint holding module.

22. An adjuster according to claim 1, wherein the first and second flexible transmission means transfer the adjustment movement of the drive means essentially in the same direction to the first and second adjusting elements.

23. A seat with a head restraint, wherein the seat comprises an adjuster according claim 1 for the vertical adjustment of the head restraint.

* * * * *